UNITED STATES PATENT OFFICE.

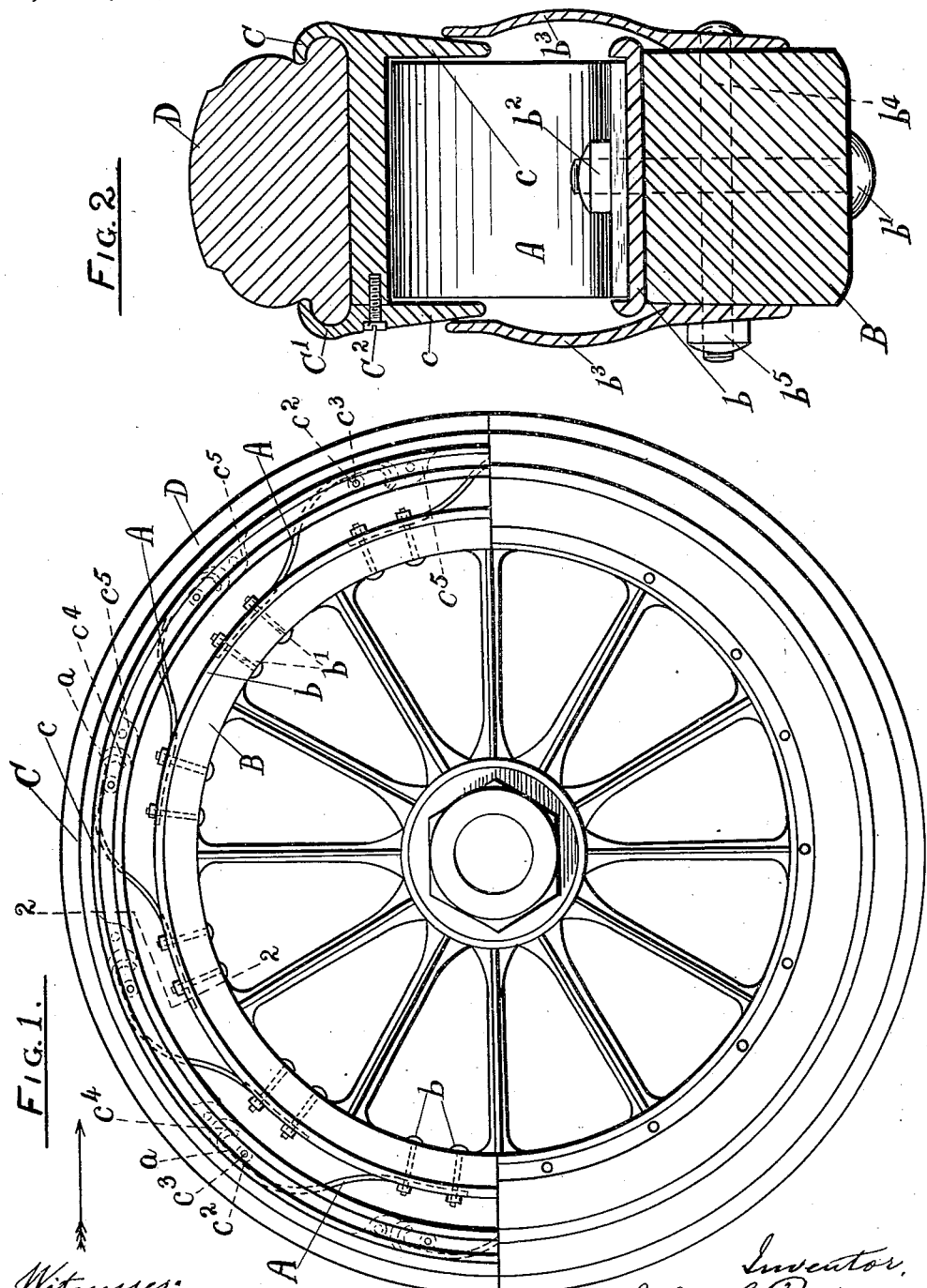

JOHN LITTLEDALE PARKER, OF GALGATE, NEAR LANCASTER, ENGLAND.

SPRING-WHEEL.

1,086,689.  Specification of Letters Patent.  Patented Feb. 10, 1914.

Application filed November 21, 1912. Serial No. 732,651.

*To all whom it may concern:*

Be it known that I, JOHN LITTLEDALE PARKER, a subject of the King of Great Britain, residing at Ashley House, Galgate, near Lancaster, in the county of Lancaster, England, have invented certain new and useful Improvements in Spring-Wheels, of which the following is a specification.

This invention relates to a resilient wheel for road vehicles, and to that type of wheel in which a number of curved blade springs are secured at intervals between the rim or felly of the wheel and a surrounding rim carrying the wheel tire.

According to this invention a number of curved blade springs are secured at intervals between the felly of the wheel and a rim which carries the wheel tire, the outer or free ends of the springs terminating between indiarubber rings or cushions carried by transverse pins and fixed clutches or abutments situated between the side flanges of the rim. The latter is conveniently made of H shape in cross section with a detachable side member and may carry an indiarubber cushion or other tire, the detachable side member facilitating the insertion and removal of the latter and also of the aforesaid springs, the side flanges previously referred to retaining the springs and tire rim in their respective positions.

In the accompanying drawings: Figure 1, is an elevation of a wheel constructed in accordance with this invention, part of the side flange being removed to show the interior of the wheel. Fig. 2, is a developed section drawn to a larger scale and taken approximately on line 2—2 of Fig. 1, looking in the direction indicated by the arrow.

A, A indicate the curved blade springs, B indicates the felly of the wheel, C the tire rim and D the tire. The felly B is encircled by a channel shaped rim $b$ in which one end of each of the blade springs A is received and is secured thereto by bolts $b^1$ and nuts $b^2$ which also serve to retain the rim $b$ securely in position upon the felly B. The free end of each of the springs A is received between flanges $c$ of the tire rim C and terminates in a hook $a$ which occupies a position between an indiarubber cushion $c^2$ on a transverse pin $c^3$ and an indiarubber cushion $c^4$ that is supported by one of the fixed abutments $c^5$ previously referred to, the said cushions being so spaced as to allow a predetermined amount of relative turning movement of the spring and the tire rim. The side flanges of the latter are advantageously inclosed between rings $b^3$ which are secured to the wheel felly by bolts $b^4$ and nuts $b^5$. These rings inclose the working parts of the wheel and give the latter the appearance of an ordinary wheel fitted with a pneumatic or cushion tire. The tire rim C is provided with a detachable side ring $C^1$ secured by screws $C^2$ to the rim to facilitate the insertion and removal of the tire and of the springs A.

What I claim as my invention and desire to secure by Letters Patent of the United States is:—

In a spring wheel, the combination, with a felly, and a series of spring blades secured at one end to the felly and having hooks at their free ends; of a rim provided with side flanges which straddle the free end portions of the spring blades, convex buffers secured between the side flanges opposite the concave sides of the hooks and clear of the end portions of the blades which bear against the rim, and concave buffers secured between the side flanges opposite the convex sides of the hooks, the hooks being slidable circumferentially of the rim between the convex and concave buffers.

In testimony whereof I affix my signature in presence of two witnesses.

JOHN LITTLEDALE PARKER.

Witnesses:
 ERNALD SIMPSON MOSELEY,
 MALCOLM SMETHURST.

Copies of this patent may be obtained for five cents each, by addressing the "Commissioner of Patents, Washington, D. C."